_United States Patent Office_

3,380,978
Patented Apr. 30, 1968

3,380,978
PROCESS FOR PRODUCING HYDROCARBON
POLYMERS
Donald James Ryan and Bartholomew John Starkey,
Orange, Tex., assignors to E. I. du Pont de Nemours
and Company, Wilmington, Del., a corporation of
Delaware
No Drawing. Continuation-in-part of application Ser. No.
200,657, June 7, 1962. This application June 17, 1965,
Ser. No. 462,061
7 Claims. (Cl. 260—88.2)

This is a continuation-in-part of our copending application United States Ser. No. 200,657, filed June 7, 1962, and now abandoned.

This invention relates to a process for the production of hydrocarbon polymers. More particularly, it relates to a process whereby essentially linear hydrocarbon homopolymers and copolymers having improved processibility and solid state properties are prepared from α-olefins containing 2–18 carbon atoms.

Because of the broad spectra of properties inherent in the hydrocarbon homopolymers and copolymers prepared from α-olefins by means of coordination polymerization catalysts, these resins are widely used in a variety of commercial applications. The usefulness of the aforesaid hydrocarbon polymers is limited in some cases, however, either because of deficiencies in certain solid state properties or because of their poor processibility. For example, some of these hydrocarbon resins exhibit inferior stress-crack resistance after conversion to shaped structures, while some provide rough or discontinuous surfaces after fabrication under high shear conditions. The art has shown that some of these deficiencies may be eliminated or at least diminished through use of hydrocarbon polymer blends. Although such blends provide superior surfaces on articles shaped therefrom, as well as a marked improvement in ease of processing, some difficulties may be encountered in their preparation. Methods customarily employed include melt blending and solution or slurry mixing of the independently formed polymeric components of the blend. When solution blending techniques are employed, low solubility of the very high molecular weight component may preclude efficient blending. Because of the wide variation in melt viscosities of the individual components melt mixing, likewise, may be impractical. Even where blending techniques have been developed, it has been noted that in some cases the improvement in processibility and shaped structure surface characteristics are offset by the deficient solid state properties of the blend. For example, articles fabricated from blends prepared from hydrocarbon polymers which differ widely in molecular weight may exhibit poor stress-crack resistance.

It is an object of the present invention to provide a process for the preparation of hydrocarbon polymers through use of coordination polymerization catalysts. It is a further object to provide a process for the preparation of hydrocarbon polymers which have excellent processiblity and solid state properties. Another object is to provide a process which allows close control of the density, molecular weight and molecular weight distribution of the product. Other objects will become apparent hereinafter.

The objects of the present invention are achieved by means of a series, two-stage, continuous coordination polymerization process wherein some of the α-olefin is converted in the first stage to a high molecular weight fraction having a broad molecular weight distribution, after which the polymer, remaining catalyst and unconverted monomer are passed directly into a second polymerization zone wherein is formed a lower molecular weight fraction having a narrower molecular weight distribution then that of the high molecular weight fraction. More precisely, the process employs a short holdup tubular reactor in series with a longer holdup, constant environment autoclave reactor. Although both types of reactors are well-known and may be used independently to produce polymers which subsequently may be blended, the blends frequently are heterogeneous, thus precluding precise control over such properties as density, molecular weight and molecular weight distribution. The present method of polymer formation, in addition to providing control over the aforesaid properties, exhibits an economic flexibility which is superior to those processes employing independently produced polymers and subsequent blending.

Precise product control in the present invention is achieved principally by imposing limitations on the tubular and autoclave reaction temperatures and pressures, reactant feed temperature, catalyst concentration, point of entry of catalyst into the reactors, contact times and the use of either a single monomer or a mixture of comonomers.

The catalysts employed herein are coordination polymerization catalysts comprising reaction products of compounds, and preferably halides, of elements selected from the group consisting of the IV–B and V–B groups of the Periodic Chart of the Elements such as may be found on pages 448–9 of the Handbook of Chemistry and Physics, 41st edition, 1959, and organometallic, metallic or metal hydride reducing agents. Examples of these catalysts are given in U.S. Patent 2,862,917, issued Dec. 2, 1958, to A. W. Anderson et al. In forming the catalyst in the present invention the molar ratio of reducing agent to compound of the Group IV–B or V–B element is 0.5–4.0, with the ratio 0.75–2.0 being preferred. The active catalyst may be formed by premixing the appropriate reactants prior to entry into the polymerizer or it may be formed by injecting the reactants directly into the polymerizer. In the latter method, the reactants may be added at the same or different positions in the reactor. In the present invention the catalyst may be introduced into both the tubular reactor and the autoclave reactor. Alternatively, the amount added to the tubular reactor may be adjusted so that catalyst carries over into the autoclave so as to eliminate further addition to the latter. In the preferred procedure all the catalyst is added to the tubular reactor. Since catalyst concentration provides a means of controlling both monomer conversion and polymer molecular weight, the amount of catalyst employed exerts considerable influence on the properties achieved in the final product. The catalyst concentration employed herein, in terms of moles of the compound of a Group IV–B or V–B element per pound of monomer converted varies from $0.04 \times 10^{-5}$ to $1.0 \times 10^{-5}$, although it is preferable to keep the catalyst level in the range $0.1 \times 10^{-5}$ to $0.5 \times 10^{-5}$. The activity of the catalyst itself may be modified by well-known techniques, such as by contacting with polar group-containing compounds, either before or after the catalyst is introduced into the polymerizer.

The temperature of operation of the tubular reactor is especially critical to achieving satisfactory results in the process since at constant conversion the molecular weight of the polymer formed decreases with increasing polymerization temperature. Since the polymerization is exothermic, unless the temperature is controlled, it will be impossible to prepare high molecular weight polymer in this reaction zone. In the present invention the exothermicity of the polymerization is utilized to advantage, however, in that a controlled thermal profile is developed across the tubular reactor to provide not only a means for giving a broad molecular weight distribution in the high molecular weight fraction but, also, a means for preheating the reactants subsequently entering the autoclave reactor. Furthermore, maintenance of precise control of the temperature profile in the tubular reactor precludes the formation of extremely high molecular weight polymer fractions which may either plug the reactor or at least cause excessive pressure drops across the system. The operating temperature of the tubular reactor in the present invention is maintained at 50–250° C. and preferably 75–230° C. The feed mixture entering the tubular reactor, i.e., monomer, catalyst and polymerization medium or diluent, generally, should be in the range 50–165° C., and preferably 75–140° C., while the temperature rise over the reactor should be 20–120° C. The constant environment autoclave reactor is operated at a temperature which usually is higher than that employed in the tubular reactor so as to produce the lower molecular weight, narrower molecular weight distribution fraction. The optimum temperature of operation of the autoclave lies in the range 150–350° C., and preferably 200–275° C.

Since coordination polymerization catalysts are well-known to be active at atmospheric as well as superatmospheric pressures, the present process may be operated over a wide range of pressures. In order to prevent ebullition of the reaction medium or diluent, however, superatmospheric pressures usually are employed, especially when it is desirable to operate at temperatures sufficient to induce or maintain solubilization of the polymer. In a particular embodiment of this process a slurry of polymer in inert diluent is formed initially at the inlet side of the tubular reactor, with solubilization being achieved prior to exiting the tubular reactor. In the practise of the present invention the pressure in both the tubular and autoclave reactors is maintained at 100–200 atmospheres and preferably at 125–160 atmospheres. The reaction medium employed may be any inert or non-polymerizable diluent which is liquid at the temperature and pressure of operation of the reactors. Examples of these include the common inert aliphatic, cycloaliphatic and aromatic hydrocarbon solvents. Preferred are the aliphatic and cycoaliphatic solvents, and especially those containing 5–10 carbon atoms, such as for example, cyclohexane. When the process is carried out so as to achieve or maintain solubilization of the polymer, the volume of diluent is limited not only by the amount necessary to achieve solubilization but, also, by the necessity for avoiding excessive pressure drops across the system, such as experienced when transporting highly viscous solutions, as well as by the recovery problems encountered in the handling of excessively large volumes of diluent. Based on the above considerations, it is preferable to adjust the diluent volume so that the concentration of polymer in solution exit the autoclave reactor is less than 20 weight percent. An especially preferred concentration of polymer in solution is 5–15 weight percent. In practise, the diluent is added in both the catalyst and monomer feed streams, although if necessary, further additions of diluent may be made to either reactor.

Holdup time in both the tubular and autoclave reactors is a particularly effective means for controlling the characteristics of the product. In order to achieve the desirable properties in the polymers produced by the present invention, it is necessary to polymerize in the short holdup tubular reactor 15–80 weight percent, and preferably 30–75 weight percent, of the total monomer being polymerized, and the remainder in the autoclave. These values may be realized by employing contact times of 0.5–100 seconds, and preferably 1–15 seconds, in the tube and at least 0.5 minute, and preferably 1.0–7.0 minutes, in the autoclave. Although holdup times may be controlled by adjusting the throughput rates, they, also may be controlled through variations in the geometry of the reactors, particularly the tubular reactor, and by variations in the point of entry of the catalyst into the reactors. The length of the tubular reactor and the catalyst injection point, the latter a convenient method of adjusting the effective length of the tube, are most often used as the means of controlling holdup time in the tube.

Employed in the process of the present invention may be any monomer which is polymerizable by means of coordination polymerization catalysts. Especially suitable herein are α-olefins containing 2–18 carbon atoms. Particularly useful polymers which may be prepared by the process described above are polymers of ethylene comprised substantially of ethylene units. These polymers of ethylene may be either an ethylene homopolymer or a copolymer of at least 90 weight percent ethylene units and up to 10 weight percent α-olefin comonomer units, said α-olefin comonomer being branched or unbranched and containing 3–18 carbon atoms. Particularly suitable as comonomers with ethylene are α-olefins containing 4–10 carbon atoms. The aforesaid polymers of ethylene which contain up to 10 weight percent bound comonomer have been found to exhibit exceptional processibility during fabrication into shaped structures and a high resistance to stress-crack after fabrication, a combination of features which is difficult to achieve by other preparative methods. In the production of the aforesaid copolymers the principal comonomer, i.e., the one forming the major weight fraction of the copolymer, is polymerized in the tubular reactor to the extent of 15–80 weight percent, and preferably 30–75 weight percent, of the total principal comonomer polymerized in both reactors. Contact times in both reactors for the formation of the copolymers is the same as indicated supra. The minor comonomer may be introduced into either the tube or the autoclave, or into both.

The ease with which the polymers prepared by the present invention may be fabricated into shaped structures, i.e., the ease of processibility, may be represented by a stress exponent "$n$" which indicates how readily the polymer-melt flows under high shear fabrication conditions, the higher values of "$n$" indicating greater ease of processibility. A further description of stress exponent may be found in U.S. Patent 2,993,882, issued July 25, 1961, to C. E. Ashby et al. The polymers prepared by this invention exhibit stress exponents greater than 1.5, usually in the range 1.9–2.1, whereas the hydrocarbon polymers of the art having comparable melt index and density values and prepared with the same coordination polymerization catalysts by conventional processes have stress exponents of less than 1.7.

The following examples are given to demonstrate but not limit the scope of the invention as hereinabove disclosed. For the following experiments a tubular reactor having an effective length of 5–45 feet and an internal diameter of 4 inches is connected in series with a constant environment autoclave reactor having a volume of 500 gallons. Separate streams of monomer in cyclohexane, after being preheated by passing through a heat exchanger, and a coordination polymerization catalyst formed by prereacting in cyclohexane aluminum triisobutyl and a mixture of vanadium oxychloride and titanium tetrachloride are fed continuously into the inlet side of the tubular reactor. The throughput rate of catalyst and monomer in cyclohexane is adjusted so as to achieve a holdup time in the tubular reactor of 1.2–15 seconds while the temperature in the tubular reactor is maintained at 68–217° C. The mixture of polymers, unconverted monomer and catalyst in cyclohexane passes directly from the exit of the tubular reactor into the stirred, constant environment, autoclave reactor where it is maintained at 235–273° C. for 1.9–6.1 minutes. The solution of polymer and catalyst in cyclohexane exit the autoclave reactor is treated by conventional methods, such as described in U.S. Patents 2,890,214 and 2,978,442, issued June 9, 1959, and Apr. 4, 1961, respectively, to E. N. Brightbill et al., to deactivate the catalyst and remove catalyst residues and to recover the polymer from cyclohexane. After purification and isolation the polymer may be converted directly into shaped structures by melt fabricating techniques or it may be melt extruded into beading and cut into cylindrical-shaped pellets for subsequent fabrication operations. The following table summarizes the data from a series of runs conducted under the aforesaid conditions. Where necessary to produce lower molecular weight polymers, hydrogen-containing cyclohexane is introduced into the tubular reactor along with the other reactants.

ticular process of the present invention leads to the formation of hydrocarbon polymers having such excellent processibility and solid state properties, it is believed that there is formed a high molecular weight fraction having a broad molecular weight distribution in the tubular reactor and a lower molecular weight fraction having a narrower molecular weight distribution in the constant environment autoclave reactor. By employing fractionation techniques the products prepared by the present invention have been separated into two components which differ appreciably in molecular weight, with each compo-

| Example Number | 1 | 2 | 3 | 4 | 5 | 6 | 7 | 8 | 9 |
|---|---|---|---|---|---|---|---|---|---|
| Wt. percent ethylene in total feed solutions | 11 | 11 | 14 | 12 | 9 | 14 | 10 | 15 | 14 |
| Wt. percent butene-1 in total feed solutions | | | | 0.4 | 0.8 | 0.9 | | 1.0 | 1.9 |
| Wt. percent octene-1 in total feed solutions | | | | | | | 0.9 | | |
| Hydrogen concentration (p.p.m. of total feed solutions) | | | 18 | | | | | 9 | 10 |
| Aluminum triisobutyl/titanium tetrachloride-vanadium oxychloride (molar ratio) | 1.2–2.2 | 1.2–2.0 | 1.2–2.0 | 1.0–2.0 | 1.2–2.2 | 1.2–2.0 | 1.2–2.0 | 1.9–2.5 | 1.9–2.8 |
| Catalyst rate (as millipound moles mixed halides plus aluminum/hour) | 25–62 | 15–48 | 5–20 | 6–20 | 18–50 | 15–30 | 7–36 | 7–30 | 12–37 |
| Total feed rate (in pounds/hour×10⁻³) | 64 | 73 | 23 | 27 | 40 | 38 | 24 | 40 | 40 |
| Tubular inlet temperature (° C.) | 159 | 159 | 83 | 140 | 140 | 113 | 128 | 68 | 116 |
| Tubular exit temperature (° C.) | 215 | 195 | 116 | 217 | 199 | 217 | 175 | 100 | 164 |
| Autoclave temperature (° C.) | 273 | 264 | 241 | 273 | 235 | 273 | 249 | 240 | 259 |
| Tubular holdup time (seconds) | 3.6 | 3.1 | 2.2 | 15 | 1.2 | 6.7 | 2.1 | 1.2 | 1.2 |
| Autoclave holdup time (minutes) | 2.2 | 1.9 | 6.1 | 5.1 | 3.5 | 3.7 | 5.8 | 3.5 | 3.5 |
| Wt. percent product made in tube | 49 | 35 | 20 | 58 | 62 | 65 | 39 | 19 | 34 |
| Wt. percent product made in autoclave | 51 | 65 | 80 | 42 | 38 | 35 | 61 | 81 | 66 |
| Melt Index (A.S.T.M. D1238–57T) | 0.9 | 0.9 | 4.0 | 0.2 | 0.4 | 0.2 | 0.2 | 3.0 | 8.0 |
| Density (A.S.T.M. D792–50) | 0.953 | 0.958 | 0.961 | 0.951 | 0.944 | 0.949 | 0.948 | 0.949 | 0.946 |
| Stress Exponent | 1.65 | 1.56 | 1.82 | 1.94 | 1.87 | 1.93 | 1.88 | 1.66 | 1.90 |

The following Examples 10, 11 and 12 illustrate modifications of the processes of the present invention and were conducted in the apparatus described in Examples 1 through 9. In Example 10, approximately 6,800 pounds/hour of ethylene and 43,200 pounds/hour of solvent at a temperature of 94° C. were fed directly to the autoclave while hydrogen in indicated concentrations was fed to the autoclave. In Example 11, approximately 8,800 pounds/hour of ethylene and 56,200 pounds/hour of solvent at a temperature of 101° C. were fed directly to the autoclave. In Example 12, approximately two parts per million of hydrogen was introduced into the tubular reaction and 2.5 pounds per million into the autoclave.

| Example Number | 10 | 11 | 12 |
|---|---|---|---|
| Wt. percent ethylene in total feed solutions | 11.61 | 91.5 | 11 |
| Wt. percent decene-1 in total feed solutions | | | 0.3 |
| Wt. percent octene-1 in total feed solutions | .36 | .36 | |
| Hydrogen concentration (p.p.m. of total feed solutions) | 10 | | 4.5 |
| Aluminum triisobutyl titanium tetrachloride-vanadium oxychloride (molar ratio) | | | 1.5–2.5 |
| Catalyst rate (as millipound moles mixed halides +aluminum/hour) | 35 | 45 | 30–60 |
| Total feed rate (in pounds/hour×10⁻³) | 84 | 84.3 | 100 |
| Tubular inlet temperature (° C.) | 100 | 103 | 100 |
| Tubular exit temperature (° C.) | 200 | 165 | 120 |
| Autoclave temperature (° C.) | 238 | 237 | 230 |
| Tubular holdup time (seconds) | 10 | 18 | 0.25 |
| Autoclave holdup time (minutes) | 1.66 | 1.66 | 1.4 |
| Wt. percent product made in tube | 30 | 10 | 15 |
| Wt. percent product made in autoclave | 70 | 90 | 85 |
| Melt Index (A.S.T.M. D1238–57T) | 0.61 | 0.98 | 0.5 |
| Density (A.S.T.M. D792–50) | 0.956 | 0.953 | 0.955 |
| Stress Exponent | 1.95 | 1.49 | 1.70 |

As indicated hereinabove the polymers prepared by the process of this invention are extremely useful in forming shaped structures where ease of processibility is essential to secure high rates of fabrication and, also, where superior solid state properties are required, such as for example, high stress-crack resistance. The superiority of resins prepared as described above is demonstrated by fabricating, by means of conventional equipment, into blown bottles, tubing and pipe, film, fibers, and the like. These resins provide excellent surface characteristics as well as exceptional stree-crack resistance.

Although it is not known unequivocally how the particular process of the present invention leads to the formation of hydrocarbon polymers having such excellent processibility and solid state properties, it is believed that there is formed a high molecular weight fraction having a broad molecular weight distribution in the tubular reactor and a lower molecular weight fraction having a narrower molecular weight distribution in the constant environment autoclave reactor. By employing fractionation techniques the products prepared by the present invention have been separated into two components which differ appreciably in molecular weight, with each component being separable into a plurality of fractions. Melt index measurements were employed to characterize the whole polymer, the two principal components and the plurality of minor fractions. The polymers prepared by this invention have melt indexes in the range 0.1–20. The preferred products are comprised of 30–80 weight percent of a high molecular weight first component which contains a plurality of fractions and has a continuous distribution of molecular weights. The melt indexes of these fractions lie in the range of $1 \times 10^{-4}$ to 1.0, with the ratio of the highest melt index to the lowest melt index within said fractions, an indication of the magnitude of distribution, being in the range 100–10,000. The melt index ratio varies within this range directly with the amount of the high molecular weight first component in the product. The remaining lower molecular weight second component comprising 20–70 weight percent of the preferred products contains a plurality of fractions having a continuous distribution of molecular weights. The melt indexes of these fractions are in the range of greater than 1.0 up to about 3,000, with the ratio of the highest melt index to the lowest melt index within said fractions being in the range 3,000–5,000, without varying directly with the amount of the lower molecular weight second component in the product. The ratio of the melt index of this second component to the melt index of the first component is 500–10,000, with the ratio within said range increasing with increasing quantities of the lower molecular weight second component in the product. Although the two principal fractions have been designated as "high molecular weight" and "lower molecular weight" components, and although it is believed that the former is produced in the tubular reactor and the latter in the autoclave, there may be small fractions of each component formed in the other reactor than above indicated. Since the fractionation work was carried out on the whole product, however, the compositions described already include any necessary correction for differences relating to situs of preparation.

The following table exemplifies typical stress exponents and environmental stress-crack resistance values obtained on polymers of ethylene prepared by the process of this invention. The stress-crack measurements were carried out using the procedure described by J. B. De Coste, F. S. Malm and V. T. Wallder, Industrial and Engineering Chemistry, 43, 117 (1951).

PHYSICAL PROPERTIES OF POLYMERS OF ETHYLENE

| | | | | | | | | | [1] 0.70 | [2] 0.70 | [3] 0.17 |
|---|---|---|---|---|---|---|---|---|---|---|---|
| Melt Index | 0.25 | 0.25 | 0.17 | 1.40 | 0.96 | 0.79 | 0.20 | [1] 0.70 | [2] 0.70 | [3] 0.17 |
| Density | 0.948 | 0.948 | 0.949 | 0.955 | 0.955 | 0.955 | 0.955 | 0.947 | | |
| Comonomer content (by infrared) | ca 1% | ca 1% | ca 1% | 0 | 0 | 0 | 0 | 0 | 0 | 0 |
| Wt. percent product made in tube | 30 | 55 | 65 | 25 | 30 | 40 | 46 | 0 | | |
| Wt. percent product made in autoclave | 70 | 45 | 35 | 75 | 70 | 60 | 54 | 100 | | |
| Highest melt index of high molecular weight fraction | 0.009 | 0.15 | 0.6 | | | | | | | |
| Lowest melt index of high molecular weight fraction | 0.0003 | 0.0015 | 0.0008 | | | | | | | |
| Ratio of highest to lowest melt index | 30 | 100 | 750 | | | | | | | |
| Melt Index of lower molecular weight fraction | 10 | 15 | 30 | | | | | | | |
| Stress exponent | 1.9 | 1.9 | 1.9 | 1.6 | 1.7 | 1.8 | 2.0 | 1.4 | 5 | 12 |
| Environmental stress-crack resistance (hours) | 60 | 120 | 216 | 8.7 | | 16 | | 50 | 5 | 12 |

[1] Prior art narrower molecular weight distribution autoclave resin having good stress-crack resistance but poor processibility. Cannot make low enough in melt index for some applications requiring good stress-crack resistance.
[2] Blend of a 275 M.I. autoclave resin and a 0.0002 M.I. tubular resin to give 0.70 M.I. product.
[3] Blend of a 275 M.I. autoclave resin and a 0.0002 M.I. tubular resin to give 0.17 M.I. product.

We claim:

1. A polymerization process comprising the steps of introducing into a tubular reaction zone, maintained at a pressure of 100–200 atmospheres, a temperature of 50–250° C. and having a controlled increasing temperature profile between its inlet and outlet with an inlet temperature in the range 50–165° C. and a temperature rise of 20–120° C., an α-olefin containing 2–18 carbon atoms and an inert nonpolymerizable diluent, polymerizing 15–80 weight percent of the total α-olefin being polymerized with a catalyst formed by admixing at a molar ratio of 0.5–4.0, a reducing agent selected from the group consisting of organometallic compounds, metals and metal hydrides and a compound of a metal selected from the group consisting of Groups IV–B and V–B of the Periodic Chart of Elements, continuously passing the reaction mixture from said tubular reactor, after an average holdup time of 0.5–100 seconds, directly into a constant environment autoclave reactor maintained at a pressure of 100–200 atmospheres and a temperature of 150–350° C., continuously removing the reaction mixture, containing less than 20 weight percent polymer in diluent, from said autoclave reactor after an average holdup time of at least 0.5 minute and separating the polymer from the reaction mixture.

2. A polymerization process comprising the steps of introducing into a tubular reaction zone, maintained at a pressure of 125–160 atmospheres, a temperature of 75–230° C. and having a controlled increasing temperature profile between its inlet and outlet with an inlet temperature in the range 50–165° C. and a temperature rise of 20–120° C., an α-olefin containing 2–18 carbon atoms and an inert hydrocarbon diluent, polymerizing 15–80 weight percent of the total α-olefin being polymerized with a catalyst formed by admixing at a molar ratio of 0.5–4.0, a reducing agent having at least one metal to hydrocarbon bond and a compound of a metal selected from the group consisting of Groups IV–B and V–B of the Periodic Chart of Elements, continuously passing the reaction mixture from said tubular reactor, after an average holdup time of 0.5–100 seconds, directly into a constant environment autoclave reactor maintained at a pressure of 125–160 atmospheres and a temperature of 200–275° C., continuously removing the reaction mixture, containing 5–15 weight percent polymer in diluent, from said autoclave reactor after an average holdup time of at least 0.5 minute and separating the polymer from the reaction mixture.

3. A polymerization process comprising the steps of introducing into a tubular reaction zone maintained at a pressure of 125–160 atmospheres, a temperature of 75–230° C. and having a controlled increasing temperature profile between its inlet and outlet with an inlet temperature in the range 50–165° C. and a temperature rise of 20–120° C., a mixture of ethylene and an α-olefin containing 4–10 carbon atoms and an inert hydrocarbon diluent, polymerizing 30–75 weight percent of the total ethylene being polymerized with a catalyst formed by admixing at a molar ratio of 0.75–2.0, a reducing agent having at least one aluminum to hydrocarbon bond and a mixture of halides of titanium and vanadium, continuously passing the reaction mixture from said tubular reactor, after an average holdup time of 1–15 seconds, directly into a constant environment autoclave reactor maintained at a pressure of 125–160 atmospheres and a temperature of 200–275° C., continuously removing the reaction mixture, containing 5–15 weight percent polymer in diluent, from said autoclave reactor after an average holdup time of 1.0–7.0 minutes and separating the polymer from the reaction mixture, said polymer having a stress exponent of greater than 1.5 and a melt index of 0.1–20.

4. A polymerization process comprising the steps of introducing into a tubular reaction zone maintained at a pressure of 125–160 atmospheres, an overall temperature of 75–230° C. and an inlet temperature in the range 50–165° C., and having a controlled increasing temperature profile of between 20–120° C. between its inlet and outlet, a mixture of ethylene and butene-1 and an inert hydrocarbon diluent, polymerizing 30–75 weight percent of the total ethylene being polymerized with a catalyst formed by admixing at a molar ratio of 0.75–2.0, a reducing agent having at least one aluminum to hydrocarbon bond and a mixture of halides of titanium and vanadium, continuously passing the reaction mixture from said tubular reactor, after an average holdup time of 1–15 seconds, directly into a constant environment autoclave reactor maintained at a pressure of 125–160 atmospheres and a temperature of 200–275° C., continuously removing the reaction mixture, containing 5–15 weight percent polymer in diluent, from said autoclave reactor after an average holdup time of 1.0–7.0 minutes and separating the polymer from the reaction mixture, said polymer having a stress exponent of greater than 1.5 and a melt index of 0.1–20.

5. A polymerization process for olefins conducted in the presence of an inert nonpolymerizable diluent comprising at least two polymerization stages arranged in series, the first polymerization stage maintained to effect a substantial portion of the polymerization and being maintained to provide an increasing polymer concentration throughout the stage and a pressure in the range 100–200 atmospheres with the temperature of the feed to the first polymerization stage being maintained in the range 50–165° C. and the monomer catalyst and diluent selected to obtain a temperature rise in the first stage of 20–120° C. with the holdup time of 0.5–100 seconds, directing the effluent from said first stage to a constant environment second stage, maintaining said second stage at a pressure in the range 100–200 atmospheres and a temperature in the range 150–350° C., adjusting the polymerization rate in said second stage to obtain a reaction mixture having less than 20% by weight of polymer therein, and thereafter recovering said polymer from said reaction mixture.

6. The process of claim 5 wherein a portion of said olefin is introduced directly into said second stage.

7. The process of claim 6 wherein hydrogen is introduced into either the first stage or second stage or both stages.

(References on following page)

References Cited

UNITED STATES PATENTS

| | | | |
|---|---|---|---|
| 2,862,917 | 12/1958 | Anderson | 260—94.9 |
| 2,868,762 | 1/1959 | Oakes | 260—878 |
| 2,964,514 | 12/1960 | Facett | 260—94.9 |
| 3,035,040 | 5/1962 | Findlay | 260—94.9 |

OTHER REFERENCES

Raff et al., Polyethylene, Interscience Publishers, Inc., New York.

JOSEPH L. SCHOFER, *Primary Examiner.*

M. B. KURTZMAN, F. L. DENSON,
*Assistant Examiners.*